UNITED STATES PATENT OFFICE.

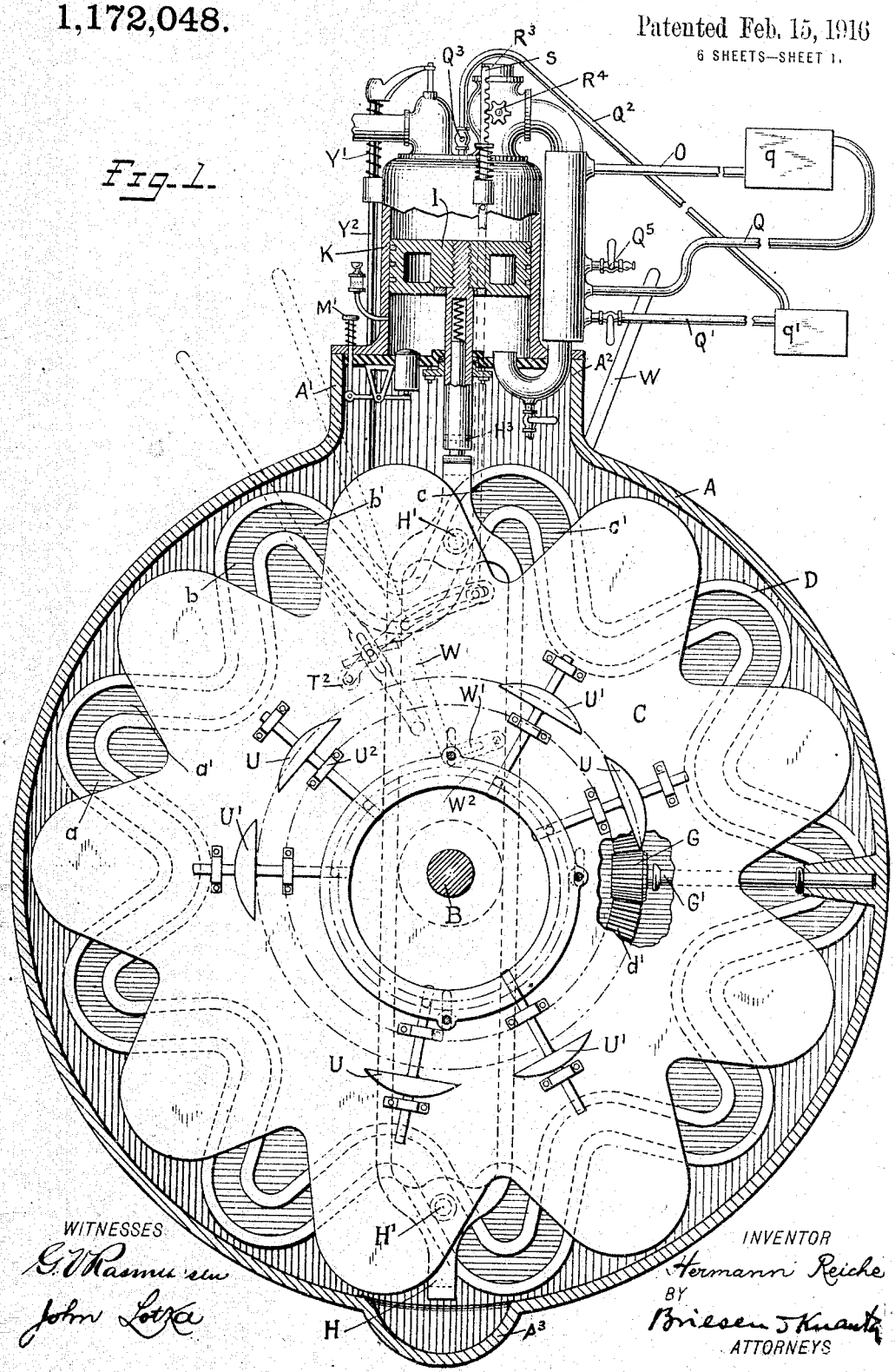

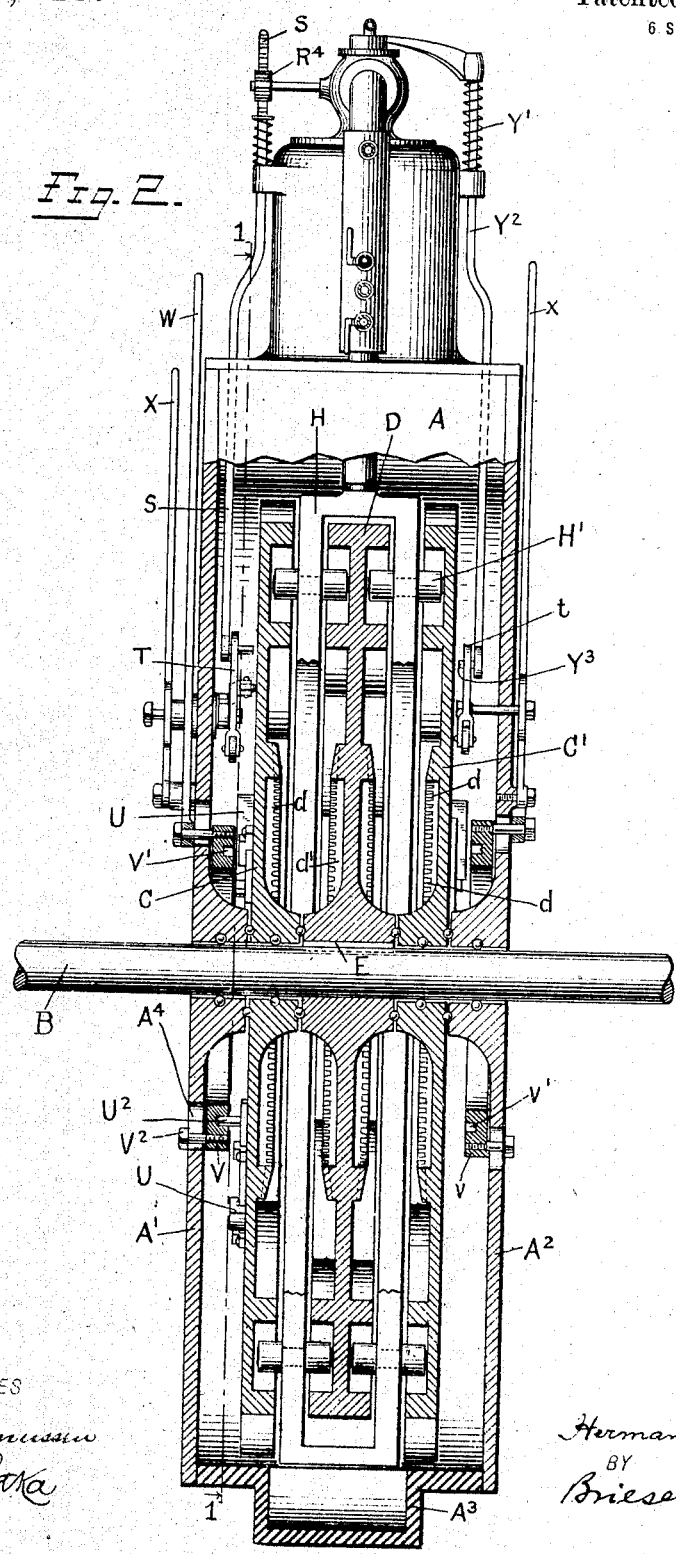

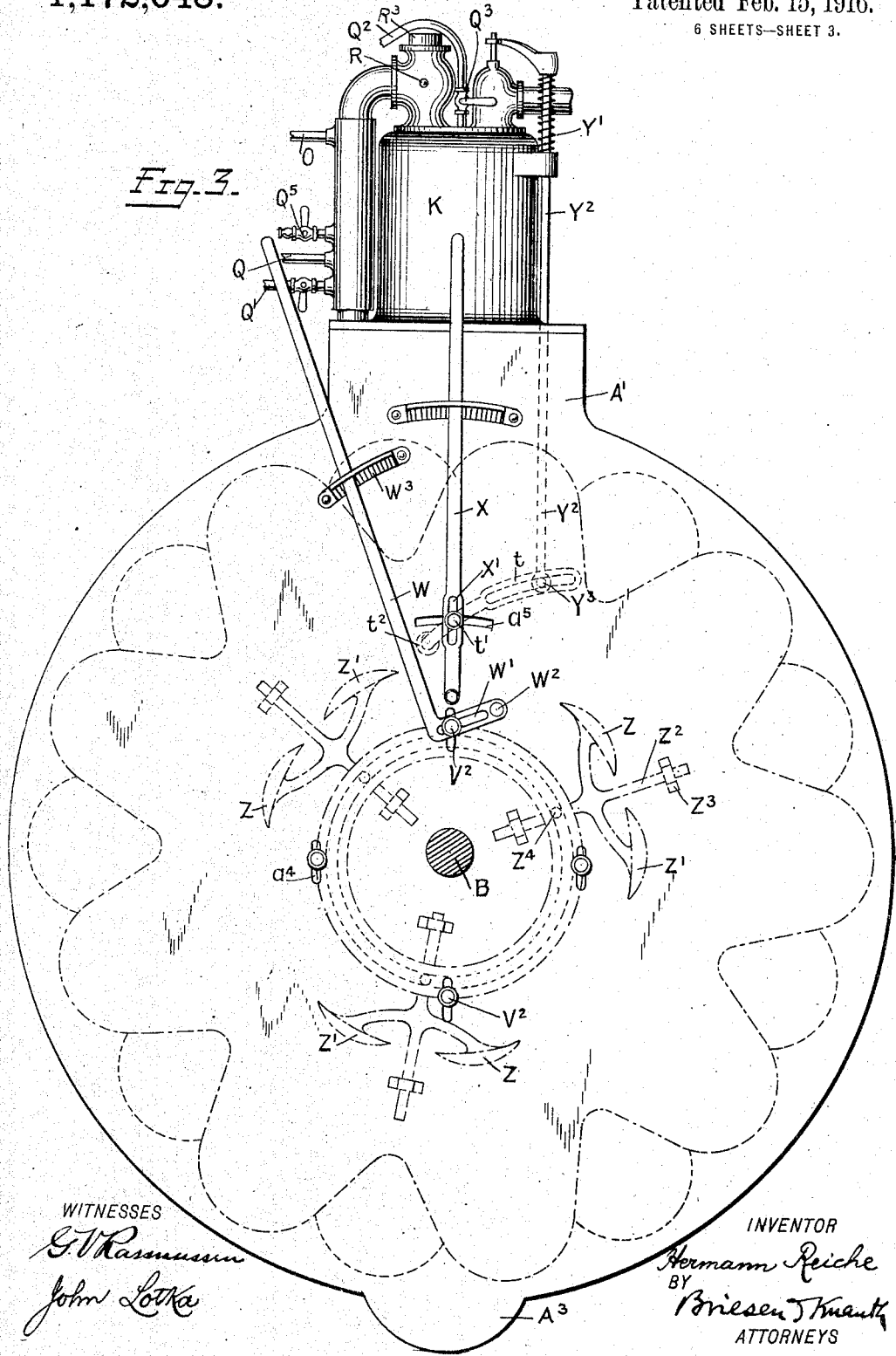

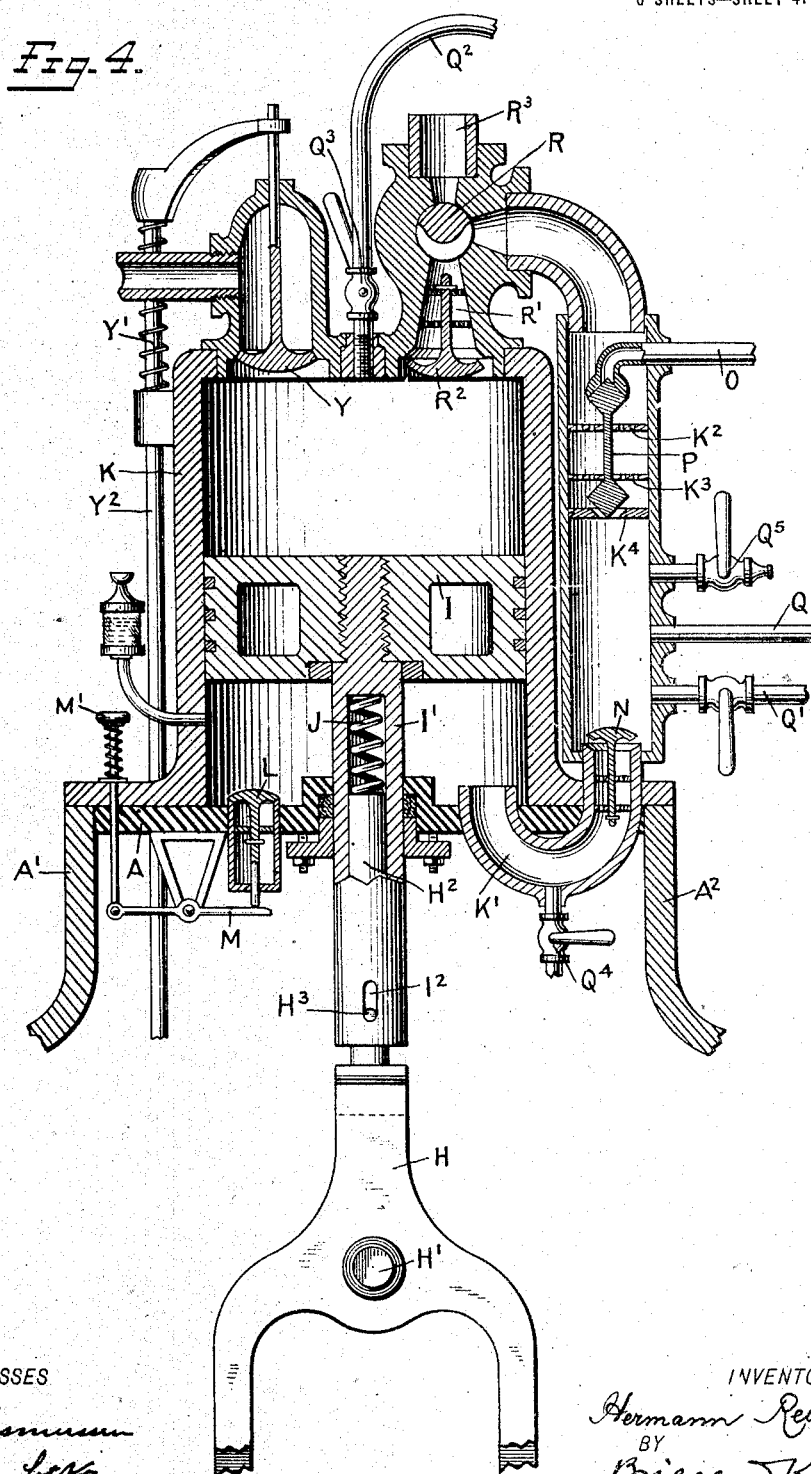

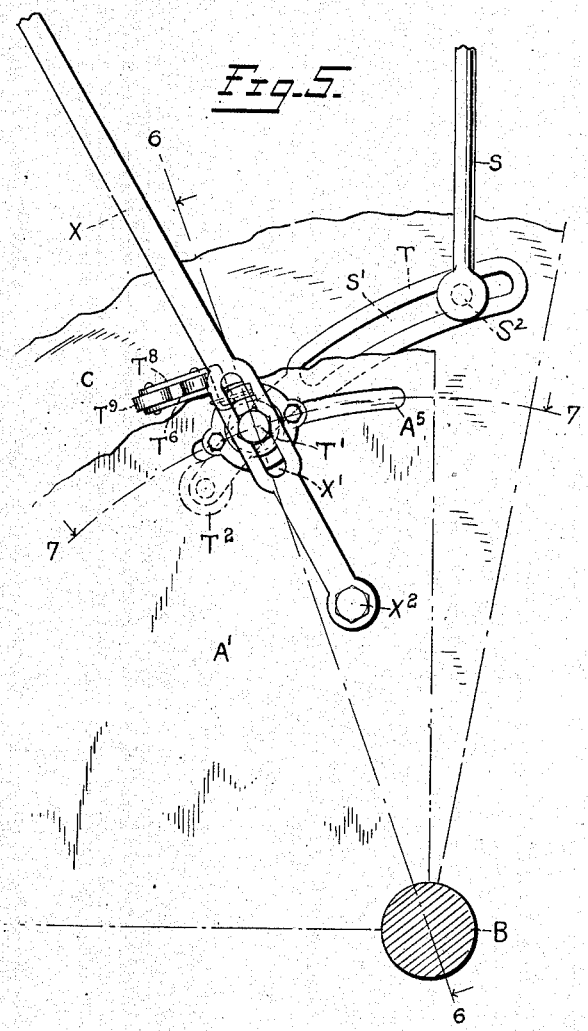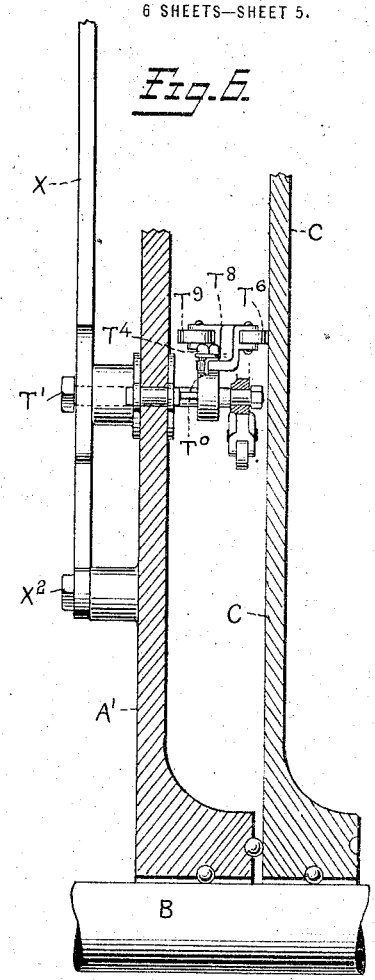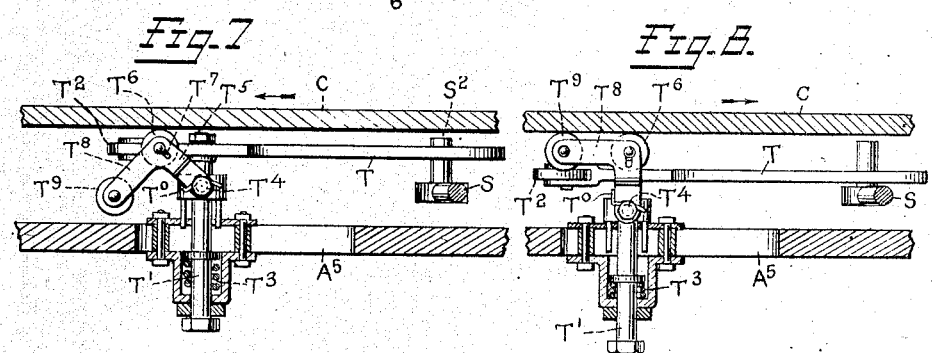

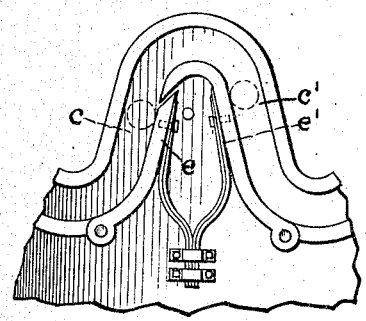
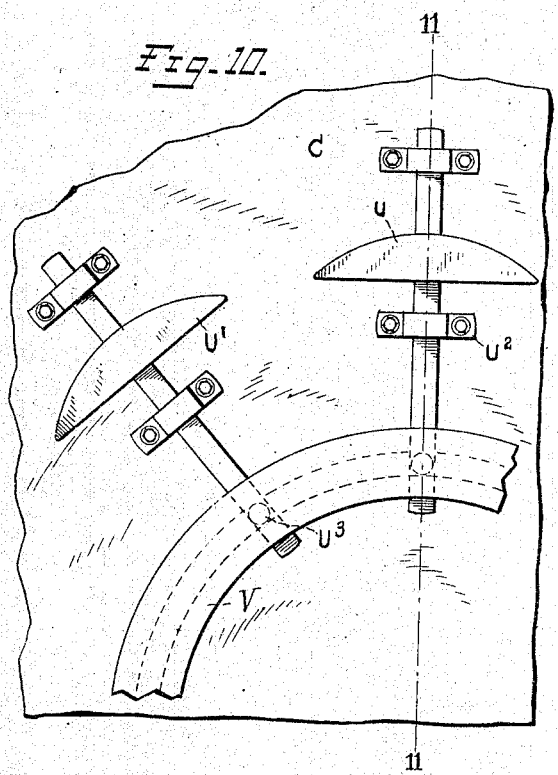
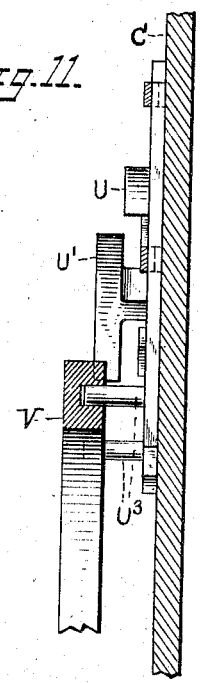

HERMANN REICHE, OF BELLEMEAD, NEW JERSEY.

INTERNAL-COMBUSTION ENGINE.

1,172,048. Specification of Letters Patent. Patented Feb. 15, 1916.

Application filed March 8, 1907. Serial No. 361,197.

*To all whom it may concern:*

Be it known that I, HERMANN REICHE, a citizen of the United States, resident of Bellemead, in the county of Somerset and State of New Jersey, have invented certain new and useful Improvements in Internal-Combustion Engines, of which the following is a specification.

My invention relates to internal combustion engines, and has for its object to provide an improved mechanism for operating an engine on the six-cycle system, and also to perfect the operation in various other respects, as will be fully described hereinafter and particularly pointed out in the appended claims.

The invention will now be described in detail, and its novel features pointed out in the appended claims.

Reference is to be had to the accompanying drawings, in which—

Figure 1 is a vertical section of an engine embodying my improvements, with parts broken away, the section being taken on line 1—1 of Fig. 2; Fig. 2 is a vertical section through the center of Fig. 1; Fig. 3 is an elevation of the engine, from the side opposite to that shown in Fig. 1; Fig. 4 is a vertical section of the cylinder, piston and adjacent parts, drawn upon an enlarged scale; Fig. 5 is a detail front view of an adjusting mechanism hereinafter referred to; Figs. 6 and 7 are sections on lines 6—6 and 7—7 respectively of Fig. 5; Fig. 8 is a view similar to Fig. 7, but showing the parts in a different position; Fig. 9 is a detail face view of the guide construction; Fig. 10 is a partial face view (on an enlarged scale) of certain cams hereinafter referred to; and Fig. 11 is a vertical section on line 11—11 of Fig. 10.

A is a casing of substantially cylindrical form, having end plates $A'$, $A^2$ in which the shaft B is suitably journaled. Adjacent to the end plates I mount on the shaft loosely two disks C, C' which are identical in construction and relative arrangement, that is, corresponding parts of these two disks aline lengthwise of the shaft B. Between the disks C, C' is mounted a central disk D connected with the shaft to turn therewith, as by a key E. Bearing rollers or balls may be employed at various points of the disks and end plates to reduce friction. Each of the disks C, C', D is formed on the face or faces which are adjacent to the other disk or disks, with a star-shaped or undulating groove of a peculiar character. Three successive undulations belong together as determining a complete cycle in the operation of the engine piston. Two of these successive undulations, as $a$, $a'$, $b$, $b'$ are or may be alike as regards the distance of their outer ends from the center, but the third undulation, $c$, $c'$ differs from them by terminating at a smaller distance from the center. That is, the outer bends of the undulations $c$, $c'$ are nearer the center than those of the undulations $a$, $a'$, $b$, $b'$. In the specific arrangement shown, the inner ends of the portions $a'$, $b$, are farther from the center than the inner ends of the other portion $b'$, $c$, $c'$, $a$, the amount of the difference being the same as that existing at the outer ends. The purpose of this arrangement will appear hereinafter. The disks C, C' occupy similar positions within the casing, but the disk D is arranged in staggered or break joint fashion, see Fig. 1, so that the outer bends of its undulations come midway between those of the outer disks C, C'. I have shown three groups of undulations (each group comprising three undulations) and I may say that an uneven number of groups presents certain advantages hereinafter set forth, but an even number of groups might be employed.

The disk D (with the shaft B) is adapted to turn in the opposite direction to the disks C, C', and gearing may be provided to positively govern the relative position of the three disks. This gearing may consist of toothed rings $d$, $d'$ on the disks C, C' and D respectively, and pinions G mounted on stationary axes $G'$; that is, these pinions rotate, but do not move otherwise. Two such pinions or more may be provided between the central disk and the outer disks, it being understood that each pinion G is permanently in mesh with one of the toothed rings $d'$ and with one of the rings $d$. The adjacent faces of the central and outer disks are spaced from each other for the passage of the reciprocating member H which is forked as shown so as to extend at each side of the central disk D, being guided by and sliding on the disk hubs. This member is provided with projections H' arranged to travel in the grooves of the disks. The projections may be simple pins, or pins carrying anti-friction rollers. When the number of groups of undulations is uneven, the reciprocating member may be provided with projections H' on opposite sides of the shaft B, as shown, and in this case the toothed rings $d$, $d'$ and pinions G might be dispensed with, and the guides on the disks need not be formed as grooves. The provision of the rings and pinions is however of greater importance when projections H' are provided only on one side of the shaft, as they must be when an even number of groups of undulations is employed or when only two disks are used. The casing may have a well or pocket $A^3$ to receive and guide the free end of the reciprocating member H. The other end of the reciprocating member is pivotally connected with the piston I either directly, or preferably, as shown, elastically, the piston rod I' being chambered to receive a spring J and also the end stem $H^2$ of the reciprocating member H, a pin $H^3$ which works in slots $I^2$, serving to prevent the piston from turning relatively to the reciprocating members or separating from it. The piston works within a cylinder K secured to the casing A. The lower or inner chamber of the cylinder preferably is closed and has an air inlet controlled by a check valve L opening into the cylinder, and a lift-lever M, operated by a spring-returned push-pin M', may be provided to manually open the valve L when desired. From the same chamber of the cylinder K a passage K' controlled by a check valve N, leads to the upper or working chamber of the cylinder, said passage being connected with a carbureter between the valve N and the working chamber, or containing a carbureter. The particular construction shown, to which I do not limit myself, comprises a fuel supply pipe O, the outlet of which is closed by a valve P when air rushes upward through the passage K'. When the valve P is open, the fuel (gasolene) flows and collects on perforated partitions $K^2$, $K^3$, $K^4$ the lower one of which has a seat for the valve P so as to close the perforation of said partition when the valve P is down.

Q is a pipe leading to the fuel tank $q$ so as to create pressure therein to feed the fuel through the pipe O, and Q' is a pipe leading to a tank $q'$ for storing air under pressure, for the purpose of more readily starting the engine, by using the starting connection $Q^2$, normally closed by a cock $Q^3$.

$Q^4$ is a drip cock, and $Q^5$ a relief cock.

Whether I employ the particular construction of carbureter above described or not, the discharge end of the passage K' may be considered as a connection leading from a fuel supply or carbureter to a mechanically operated two-way cock or valve R, from which a passage R', controlled by a check valve $R^2$, leads to the working chamber of the cylinder K. The valve R connects the passage R' at certain times with the carbureter or fuel supply passage K', and at other times with the atmosphere, through a connection $R^3$.

The mechanism for operating the valve R is governed by the rotating parts, and in the particular embodiment shown is constructed as follows: A pinion $R^4$ is rigidly secured to the cock or valve R, and is in mesh with a spring-pressed rack S, suitably guided in a stationary part, and pivotally connected with a lever T, fulcrumed at T'. The lever T carries an antifriction roller $T^2$ which is adapted to engage the three cams U or the three cams U', each set being arranged in a different plane, and each comprising as many cams as there are groups of undulations in the grooves of the disks C, C', D. The lever T can be shifted into operative relation to either the cams U or the cams U', by the following mechanism: Said lever is carried loosely by the pivot or fulcrum T' which a spring $T^3$ tends to keep inward against the disk C (see Fig. 7), in operative relation to the cams U. To the fulcrum or pivot T' is hinged at $T^4$ an arm $T^5$, longer than the inner portion of the pivot T' (counting from the connection $T^4$) and carrying a roller $T^6$ adapted to engage the disk C and capable of a certain play owing to the provision of slots $T^7$. The inner end of the arm $T^5$ is at one side of the lever T, and has an extension $T^8$ arranged at a right angle to the body of the arm and carrying a roller $T^9$. A spring $T^0$ tends to throw the arm into the position shown in Fig. 8. As long as the disk C rotates in the direction indicated in this figure, the arm $T^5$ will be substantially parallel with the pivot T', the roller $T^9$ engaging the disk C and keeping the lever T in operative relation to the set of cams U'. Should the direction of the disk's rotation be reversed (as by intentionally effecting an early ignition) the arm $T^5$ will assume the oblique position shown in Fig. 7, the roller $T^6$ then riding on the disk C, and the lever T being shifted inward to coöperate with the set of cams U. Similarly should the engine be reversed while the parts are in the position last referred to, the changed motion of the disk C will carry the arm $T^5$ to the position shown in Fig. 8, thus shifting the lever T outward to again coöperate with the cams U'.

The cams U, U' are carried by the disk C and are mounted to slide radially in guides $U^2$. Pins or other projections $U^3$ extend from the cam stems into a groove V' of a normally stationary disk or ring V, provided with guide pins $V^2$ working in vertical slots $A^4$ of the end plate A'. One of the said pins also projects into the slot W' of a lever W fulcrumed at $W^2$ on the end plate A', and secured in position by a rack segment $W^3$ and a suitable pawl, or in any other approved manner. The distance of the cams U, U' from the shaft B, at the time they engage the roller T², may thus be varied to alter the extent of movement given to the valve or cock R.

The lever T has a slot S' into which fits the pin S² at the lower end of the rack bar S. The said lever together with its fulcrum or pivot T', may be carried toward or from the rack bar S, by the following mechanism: The pivot T' extends through a slot A⁵ of the end plate A', which slot is concentric with the shaft B, and the pivot T' further extends into a longitudinal slot X' of an adjusting lever X fulcrumed on the end plate A² at X². This lever may be held against accidental movement, by any suitable device.

The exhaust valve Y is normally kept closed by a spring Y' acting on the valve operating rod Y², the lower end of said rod having a pin Y³ projecting into a segmental slot of the lever t, pivoted at t' adjacent to the end plate A² of the casing A, and provided with an antifriction roller t². This roller is adapted to be engaged by cams Z, Z', arranged in connected sets of two, there being as many sets of these cams as there are groups of undulations in the guides of the disks or rotary members C, C', D. All the cams Z, Z', lie in the same plane. The cam stems Z³ are guided in collars Z² carried by the disk C', and are provided with pins Z⁴ projecting into a groove v' of a normally stationary ring v. This ring is supported and adjusted in the same manner as described above in connection with the ring V, and the pivot t' is adjustable circumferentially, that is toward and from the rod Y², by mechanism similar to that employed for shifting the pivot T'. I shall not, therefore, repeat the description of these details, but corresponding parts of the two adjusting mechanism have been designated by analogous reference characters in the drawings.

The operation of the engine proper is materially different from the usual practice in two important respects. First, the engine is a six-cycle engine; and second, only the explosing or working stroke and the compression stroke preceding it immediately, terminate at the same outward point, as in usual engines, the other strokes extending outward practically to the cylinder head. The fact that the exhaust stroke is longer than the explosion stroke insures a much more thorough expulsion of the burnt gases. Briefly described, the six-cycle operation of my engine is as follows: (1) Suction stroke (of great length) to draw the combustible mixture into the working chamber of the cylinder. (2) Compression stroke (of less length) to compress the charge in the working chamber. (3) Explosion or working stroke (of the same length as the compression stroke). (4) Exhaust stroke (of great length). (5) Suction stroke to draw air into the working chamber. (6) Scavenging stroke (terminating close to the cylinder head) to drive this air out of the working chamber, together with any remnants of burnt gases. The long strokes (1 and 4) may be practically the full length of the working chamber, so that a perfect exhaust is obtained. The addition of the air suction and scavenging strokes (5 and 6) is a further safeguard for thoroughly cleaning out the working chamber before the admission of a new charge, and also presents the advantage of cooling the cylinder and piston. The air strokes (5 and 6) in this particular case are of the same length as the compression and explosion strokes (2 and 3). This is rendered necessary by the provision of coöperating projections H' on the reciprocating member H at opposite sides of the shaft B; if it were not for this, the air strokes (5 and 6) might be of the full length like the fuel suction and exhaust strokes (1 and 4). The increased length of the fuel suction stroke insures a powerful charge.

In detail the operation of the engine proper, in the specific case illustrated by the drawings is as follows:

(1) *Suction stroke downward.*—The valve R (through the action of a cam U or U') stands in the position in which the carbureter connection is open to the passage R' (Fig. 4). The valve R² opens automatically, and the compressed air contained in the passage K' rushes toward and into the upper or working chamber of the cylinder K. This will lift the valve P off its seat on the partition K⁴ and force it against the outlet of the fuel supply pipe O, thus closing said outlet. The gasolene which has collected on the partitions or shelves K², K³, K⁴ will be sprayed and mixed with the air, the mixture reaching the cylinder past the check valve R². In the lower chamber of the cylinder, air previously admitted through the valve L is transferred to the passage K' past the open check valve N.

(2) *Compression stroke, upward.*—The check valve R² closes automatically, the valve R is turned (by the spring on the rack S) so as to connect passage R' with the air through the connection R³, and the mixing valve P falls back by gravity on to its seat on the partition K⁴. The charge is compressed above the piston I. The valve L opens automatically to admit air into the chamber below the piston, while the check valve N closes automatically. This stroke is shorter, since some space must be left at the end of the stroke to contain the compressed mixture.

(3) *Explosion or working stroke, downward.*—The mixture is ignited in any suitable manner. As the piston descends, a further charge of air is transferred to the passage K' from the lower chamber of the cylinder, in the same manner as during the first suction stroke.

(4) *Exhaust stroke, upward.*—The valve Y is opened by the action of one of the cams Z, and the burnt gases are expelled from the working chamber. At the same time a fresh supply of air is drawn into the chamber below the piston, in the same manner as during the second stroke.

(5) *Air-suction stroke, downward.*—The check valve R² opens to admit air through valve R to the working chamber. In the lower chamber of the cylinder, a third charge of air is compressed and transferred to the passage K', as during the first and third strokes.

(6) *Scavenging stroke, upward.*—The check valve R² closes automatically, and the exhaust valve Y is opened again by the action of one of the cams Z', the air and any remnant of burnt gases being thus expelled from the working chamber. In the lower chamber of the cylinder, another charge of air is drawn in through the valve L, as during the second and fourth strokes. At the end of this sixth stroke, one of the cams U or U' causes the valve R to be turned to the position shown in Fig. 4, thus connecting the carbureter with the passage R'.

The advantages of this particular six-cycle operation are threefold: First, a thorough removal of the burnt gases, second, a more efficient cooling of the cylinder and piston; and third an abundant supply of compressed air and a greatly increased supply of explosive mixture, since practically three charges of air are forced into the passage K' during each cycle or period of six strokes.

The difference in the length of the various piston strokes described above is obtained by the peculiar formation of the guide grooves on the disks C, C', D. The short undulations c, c' correspond to the short second and third strokes respectively, while the undulations a, a', b, b', terminate at a greater distance from the center, so as to give the proper effect to the other strokes of the piston. During the third stroke (working stroke), the piston I through the medium of the reciprocating member H, drives the disks C, C', D and the shaft B. The momentum of the parts carries them during the other strokes of the piston, and the undulations a, a', b, b' and c govern the length and position of the piston stroke as described.

It will be seen that the projections H' act in opposite directions on the disk D and on the disks C, C', and are, as it were, at crossing points of the guide grooves of said disks (see Fig. 1). This relieves the piston and cylinder entirely of detrimental side strains. Longitudinal strains are greatly diminished by employing an elastic connection between the piston I and the reciprocating member H, although a rigid connection might be substituted. To further guard against the effect of shocks, the inner walls of the guide portions c', (corresponding to the working stroke) may be of an elastic nature, as indicated at e' in Fig. 9, and when the engine is reversible, a similar construction e may be employed at the guide portions c, since these correspond to the working stroke upon reversing the engine. By shifting the ring V or v, the extent to which the valve R or Y respectively is opened may be regulated, to control the speed of the engine. In fact if the rings V, v are so adjusted that the cams U, U', Z, Z', or even only one set of them, will not engage the corresponding lever T or t, the engine will be braked or stopped very quickly, since the exhaust valve would remain closed, or the valve R would remain closed to the passage K', or both conditions might be produced at the same time. By shifting the fulcrum or pivot T' or t' of the lever T or t respectively, the timing of the valve R or Y may be altered, for the purpose of varying the speed, or simply to adjust these valves to secure the best results.

Various modifications may be made without departing from the nature of my invention. Thus, while I have shown only one cylinder and piston, a plurality of them may be employed. The arrangement of stationary and rotary parts might be reversed, that is, the cylinder might be mounted on a rotary carrier, while the disk carrying the undulating guide would be stationary. I desire it to be understood that the appended claims cover this reversal as an equivalent. Also while the undulating guide, in the example shown, lies in a single plane, the path of the projection H' being alternately nearer to and farther from the center, such guide need not be so disposed.

I claim:

1. The combination, with the reciprocating working member of an internal combustion engine and a projection operatively connected therewith, of a rotary member having a continuous guide on a lateral face thereof, said guide being positively engaged with said projection and comprising waves of different heights arranged about the periphery of said rotary member in an endless series of identical groups so that the stroke will vary as the projection engages different waves.

2. The combination, with the reciprocating working member of an internal combustion engine, and a projection operatively connected therewith, of a rotary member having a guide forming a continuous path and comprising waves engaged by said projection, each wave corresponding to a forward and return stroke of the working member, and a wave of relatively small height being succeeded by two waves of greater height.

3. The combination, with the reciprocating working member of an internal combustion engine, and a projection operatively connected therewith, of a rotary member having a guide forming a continuous path and comprising waves engaged by said projection, each wave corresponding to a forward and return stroke of the working member, and a wave of relatively small height being succeeded by two waves of greater height, and means operated by the rotary member, for so governing the operation of the engine that it will have short compression and working strokes corresponding to the relatively low wave, and exhaust, air-suction, scavenging, and fuel-injection strokes corresponding to the two higher waves.

4. The combination, with the reciprocating working member of an internal combustion engine, provided with operating valves, of two projections operatively connected therewith; a rotary member having a guide forming a continuous path and comprising waves of different heights engaged by said projections, each wave corresponding to a forward and a return stroke of the working member and the number of waves being uneven, said waves being further arranged in groups of three; and means determinately related to each of said groups for actuating the engine valves at suitable times so that there will be short compression and working strokes, followed by a long exhaust stroke, a shorter air suction stroke, an air expulsion stroke of the same length as the air suction stroke, and a fuel injection stroke of the same length as the exhaust stroke.

5. The combination with the reciprocating working member of an internal combustion engine provided with operating valves, of two projections operatively connected therewith; a rotary member having a guide forming a continuous path and comprising waves of different heights engaged by said projections each wave corresponding to a forward and a return stroke of the working member and the number of waves being uneven, said waves being further arranged in groups of three; and means fixed to said rotary member in determined relation to each of said groups for actuating the engine valves at suitable times so that there will be short compression and working strokes, followed by a long exhaust stroke, a shorter air suction stroke, an air expulsion stroke of the same length as the air suction stroke, and a fuel injection stroke of the same length as the exhaust stroke.

6. The combination, with the reciprocating driving member of an internal combustion engine, of a projection driven by said reciprocating member, and a rotary member having an undulating guide in engagement with said projection, the guide being cushioned at the portion which corresponds to the working stroke of the engine.

7. The combination of the cylinder and the piston of an internal combustion engine, one arranged to reciprocate relatively to the other, the cylinder having two heads so as to form a working chamber on one side of the piston and an air chamber on the other side of the piston, a valve controlling the inlet to said air chamber, a valved passage connecting the two chambers of the cylinder, a fuel supply connected with said passage, a duct leading from said passage to the outside air, and a valve located in said passage between the fuel supply and the working chamber and arranged to connect the latter alternately with the fuel and air supply and with the outside air.

8. The combination of the cylinder and the piston of an internal combustion engine, one arranged to reciprocate relatively to the other, the cylinder having two heads so as to form a working chamber on one side of the piston and an air chamber on the other side of the piston, a valve controlling the inlet to said air chamber, a valved passage connecting the two chambers of the cylinder, a fuel supply connected with said passage, an air storage tank likewise connected with said passage, and a separate valved connection leading from said tank to the working chamber of the cylinder.

9. The combination, with the reciprocating member of an internal combustion engine, and a projection operatively connected therewith, of a rotary member having an undulating guide engaged by said projection, a valve controlling an outlet from the working chamber of the cylinder, and mechanism, carried by the rotary member, for opening said valve during two successive strokes of like direction, while leaving it closed during the third stroke in the same direction.

10. The combination, with the reciprocating member of an internal combustion engine, and a projection operatively connected therewith, of a rotary member having an undulating guide engaged by said projection, a valve controlling an outlet from the working chamber of the cylinder, and duplicate cams, carried by the rotary member, for opening said valve during two successive strokes of like direction, while leaving it closed during the third stroke in the same direction.

11. The combination, in an internal combustion engine, provided with a cylinder of a reciprocating member, a rotary member provided with a guide positively engaged by said reciprocating member, said guide comprising undulations arranged in sets so as to have two short half undulations, a long half undulation, then two short half undulations and finally a long half undulation, valve chambers attached to said cylinder and forming passages communicating with the interior thereof and valves within said chambers actuated by said rotary member with definite relation to said half undulations whereby is secured in sequence a fuel injection stroke, a compression stroke, an explosion stroke, an exhaust stroke, an air suction stroke and a scavenging stroke, the fuel suction and exhaust strokes being longer than the other strokes.

12. An internal combustion engine having a cylinder and a piston, one arranged to reciprocate relatively to the other, the cylinder having two heads to form a working chamber and an air chamber on opposite sides of the piston, a passage for transferring air from the air chamber to the working chamber, a valved inlet leading to the air chamber, a fuel inlet leading to said passage, a cock located in said passage between the fuel inlet and the working chamber, an exhaust valve controlling the outlet of the cylinder, a separate air connection to the cock, and means controlled by the operation of the engine for so operating the cock and the exhaust valve that the engine will be a six-cycle engine with the following sequence of strokes: first, injection of the explosive mixture into the working chamber and simultaneous forcing of air from the air chamber into the connecting passage; second, compression of the charge in the working chamber and simultaneous drawing of air into the air chamber; third, ignition of the fuel in the working chamber, and forcing of another quantity of air from the air chamber into the connecting passage; fourth, exhaust from the working chamber and simultaneous drawing of air into the air chamber; fifth, suction of air into the working chamber and simultaneous forcing of a third quantity of air from the air chamber to the connecting passage; and sixth, expulsion of air and any remnant of burnt gases from the working chamber simultaneously with suction of air into the air chamber.

13. An internal combustion engine having a cylinder and a piston, one arranged to reciprocate relatively to the other, a reciprocating member having a cushioned connection with the reciprocating part of the engine, and a rotary member having an undulating guide engaged by said reciprocating member so as to determine the length and sequence of the engine strokes, that portion of the guide with which the reciprocating member is engaged during an explosion stroke being made elastic.

14. An internal combustion engine having a cylinder and a piston, one arranged to reciprocate relatively to the other, a reciprocating member having a cushioned connection with the reciprocating part of the engine, and a reversible rotary member having an undulating guide engaged by said reciprocating member so as to determine the length and sequence of the engine strokes, the engaged portion of said guide corresponding to a given phase or condition of the stroke being different according as the engine is running direct or reverse, those portions of the guide with which the reciprocating member is engaged during an explosion stroke either direct or reverse, being made elastic.

15. The combination, with the reciprocating driving member of an internal combustion engine, of a projection driven by said member, a reversible rotary member having an undulating guide engaged by said projection, those portions of said guide which are engaged with the aforesaid projection during an explosion stroke, whether direct or reverse, being elastic.

16. In an internal combustion engine, the combination with a casing, a shaft journaled therein, a rotary member having an undulating guide and fixed on said shaft, and a reciprocating member in engagement with said rotary member, of means for compensating the lateral strain of said reciprocating member, said means comprising a second rotary member, in engagement with said reciprocating member identical with the first named rotary member and loosely embracing said shaft, gearing attached to said casing and operatively interlocking said rotary members in such a way, to cause relative opposite rotation and equal velocity of the rotary members.

17. In an internal combustion engine, the combination with a casing, a shaft journaled therein, a rotary member having an undulating guide and fixed on said shaft, and a reciprocating member in engagement with said rotary member, of means for guiding said reciprocating member radially with respect to said rotary member, said means comprising a second rotary member in engagement with said reciprocating member identical with the first named rotary member and loosely embracing said shaft, gearing attached to said casing and operatively interlocking said rotary members in such a way, to cause relative opposite rotation and equal velocity of the rotary members.

18. In an internal combustion engine, the combination with a casing, a shaft journaled therein, a rotary member having an undulating guide fixed on said shaft and a rotary member having an undulating guide loosely embracing said shaft, of a reciprocating member in operative engagement with each of said rotary members simultaneously at radially opposite points thereof and adapted to govern the relative movement of said rotary members.

19. The combination of the cylinder and the piston of an internal combustion engine, one arranged to reciprocate relatively to the other, the cylinder having two heads so as to form a working chamber on one side of the piston and an air chamber on the other side of the piston, a valve controlling the inlet to said air chamber, a valved passage connecting the two chambers of the cylinder, a fuel tank, a fuel pipe, and an air pipe connecting said tank with said passage and a valve located in said passage between the fuel pipe and the working chamber, and arranged to connect the latter alternately with the fuel and air supply and with the outside air.

20. In an internal combustion engine, the combination with a piston, a cylinder having two heads, so as to form a working chamber on one side and an air chamber on the other side of the piston, a valved passage connecting the two chambers and a fuel supply leading to said passage, of means for inhaling air into the air chamber by the reciprocations of the piston and injecting into the working chamber a charge of explosive mixture, which is the product of a plurality of such reciprocations, and the volume of which, at atmospheric pressure, is greater than the cubic contents of the working chamber.

21. In an internal combustion engine, the combination with a casing, a shaft journaled therein, two intergeared rotary members embracing said shaft, arranged to rotate in opposite directions and provided with undulating guides, of a reciprocating member in operative engagement with said guides.

22. In an internal combustion engine, the combination with a casing, a shaft journaled therein, a rotary member having an undulating guide fixed on said shaft and a rotary member having an undulating guide loosely embracing said shaft, of a reciprocating member astraddle of said shaft and in dual operative engagement with the guide of each of said rotary members, adapted to effect the rotation of said rotary members in a relatively opposite direction.

23. In an internal combustion engine, a casing, a shaft, a rotary member having an undulating guide fixed on said shaft, two rotary members having undulating guides loosely embracing said shaft and adapted to rotate oppositely thereto, a reciprocating member and means comprising a plurality of projections attached thereto and in engagement with said guides and adapted to transmit power from said reciprocating member to said rotary members and from said rotary members to said reciprocating member.

In testimony whereof, I have hereunto signed my name in the presence of two subscribing witnesses.

HERMANN REICHE.

Witnesses:
JOHN LOTKA,
JOHN A. KEHLENBECK.